(12) United States Patent
Oesterberg et al.

(10) Patent No.: US 9,394,746 B2
(45) Date of Patent: Jul. 19, 2016

(54) UTILIZATION OF EXPANDABLE REAMER BLADES IN RIGID EARTH-BORING TOOL BODIES

(71) Applicant: Baker Hughes Incorporated, Houston, TX (US)

(72) Inventors: Marcus Oesterberg, Kingwood, TX (US); James D. Enterline, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 454 days.

(21) Appl. No.: 13/841,194

(22) Filed: Mar. 15, 2013

(65) Prior Publication Data

US 2013/0306380 A1    Nov. 21, 2013

Related U.S. Application Data

(60) Provisional application No. 61/647,640, filed on May 16, 2012.

(51) Int. Cl.
*E21B 10/26* (2006.01)
*E21B 10/32* (2006.01)
*B23P 15/46* (2006.01)
*B23P 15/28* (2006.01)
*B23P 6/00* (2006.01)

(52) U.S. Cl.
CPC . *E21B 10/32* (2013.01); *B23P 6/00* (2013.01); *B23P 15/28* (2013.01); *B23P 15/46* (2013.01); *E21B 10/26* (2013.01); *Y10T 29/4973* (2015.01); *Y10T 29/49723* (2015.01); *Y10T 29/49741* (2015.01); *Y10T 29/49742* (2015.01); *Y10T 29/49817* (2015.01); *Y10T 29/49963* (2015.01)

(58) Field of Classification Search
CPC .......... E21B 10/26; E21B 10/28; E21B 10/32
See application file for complete search history.

(56) References Cited

U.S. PATENT DOCUMENTS

| 1,678,075 A | 7/1928 | Phipps |
| 2,069,482 A | 2/1937 | Seay |
| 2,177,721 A | 10/1939 | Johnson et al. |
| 2,344,598 A | 3/1944 | Church |

(Continued)

FOREIGN PATENT DOCUMENTS

| EP | 246789 A2 | 11/1987 |
| EP | 1036913 A1 | 10/2002 |

(Continued)

OTHER PUBLICATIONS

International Search Report for International Application No. PCT/US2013/041393 dated Aug. 23, 2013, 5 pages.

(Continued)

*Primary Examiner* — Brad Harcourt
(74) *Attorney, Agent, or Firm* — TraskBritt

(57) ABSTRACT

An earth-boring tool includes a tool body of a fixed-blade reaming apparatus configured to be coupled within the drilling assembly. The tool body has a longitudinal axis and at least one reamer blade configured to be outwardly extendable for use in an expandable reamer and attachable on a fixed-blade reamer. The at least one reamer blade is attached to the tool body in an immovable manner relative to the tool body during use of the earth-boring tool in the formation of a subterranean wellbore.

20 Claims, 8 Drawing Sheets

(56) References Cited

U.S. PATENT DOCUMENTS

| | | |
|---|---|---|
| 2,754,089 A | 7/1956 | Kammerer, Jr. |
| 2,758,819 A | 8/1956 | Kammerer, Jr. |
| 2,834,578 A | 5/1958 | Carr |
| 2,882,019 A | 4/1959 | Carr et al. |
| 3,105,562 A | 10/1963 | Stone et al. |
| 3,123,162 A | 3/1964 | Rowley |
| 3,126,065 A | 3/1964 | Chadderdon |
| 3,211,232 A | 10/1965 | Grimmer |
| 3,224,507 A | 12/1965 | Cordary, Jr. |
| 3,425,500 A | 2/1969 | Fuchs |
| 3,433,313 A | 3/1969 | Brown |
| 3,556,233 A | 1/1971 | Gilreath |
| 3,680,646 A * | 8/1972 | Hughes et al. ............... 175/323 |
| 4,190,124 A | 2/1980 | Tery |
| 4,403,659 A | 9/1983 | Upchurch |
| 4,458,761 A | 7/1984 | Van Vreeswyk |
| 4,545,441 A | 10/1985 | Williamson |
| 4,589,504 A | 5/1986 | Simpson |
| 4,660,657 A | 4/1987 | Furse et al. |
| 4,690,229 A | 9/1987 | Raney |
| 4,693,328 A | 9/1987 | Furse et al. |
| 4,842,083 A | 6/1989 | Raney |
| 4,848,490 A | 7/1989 | Anderson |
| 4,854,403 A | 8/1989 | Ostertag et al. |
| 4,884,477 A | 12/1989 | Smith et al. |
| 4,889,197 A | 12/1989 | Boe |
| 5,139,098 A | 8/1992 | Blake |
| 5,211,241 A | 5/1993 | Mashaw et al. |
| 5,224,558 A | 7/1993 | Lee |
| 5,265,684 A | 11/1993 | Rosenhauch |
| 5,293,945 A | 3/1994 | Rosenhauch et al. |
| 5,305,833 A | 4/1994 | Collins |
| 5,318,131 A | 6/1994 | Baker |
| 5,318,137 A | 6/1994 | Johnson et al. |
| 5,318,138 A | 6/1994 | Dewey et al. |
| 5,332,048 A | 7/1994 | Underwood et al. |
| 5,343,963 A | 9/1994 | Bouldin et al. |
| 5,361,859 A | 11/1994 | Tibbitts |
| 5,368,114 A | 11/1994 | Tandberg et al. |
| 5,375,662 A | 12/1994 | Echols, III et al. |
| 5,425,423 A | 6/1995 | Dobson et al. |
| 5,437,308 A | 8/1995 | Morin et al. |
| 5,553,678 A | 9/1996 | Barr et al. |
| 5,560,440 A | 10/1996 | Tibbitts et al. |
| 5,740,864 A | 4/1998 | de Hoedt et al. |
| 5,788,000 A | 8/1998 | Maury et al. |
| 5,823,254 A | 10/1998 | Dobson et al. |
| 5,887,655 A | 3/1999 | Haugen et al. |
| 6,039,131 A | 3/2000 | Beaton |
| 6,059,051 A | 5/2000 | Jewkes et al. |
| 6,070,677 A | 6/2000 | Johnston |
| 6,109,354 A | 8/2000 | Ringgenberg et al. |
| 6,116,336 A | 9/2000 | Adkins et al. |
| 6,131,675 A | 10/2000 | Anderson |
| 6,189,631 B1 | 2/2001 | Sheshtawy |
| 6,213,226 B1 | 4/2001 | Eppink et al. |
| 6,227,312 B1 | 5/2001 | Eppink et al. |
| 6,260,636 B1 * | 7/2001 | Cooley et al. ............... 175/408 |
| 6,289,999 B1 | 9/2001 | Dewey et al. |
| 6,325,151 B1 | 12/2001 | Vincent et al. |
| 6,340,064 B2 | 1/2002 | Fielder et al. |
| 6,378,632 B1 | 4/2002 | Dewey et al. |
| 6,488,104 B1 | 12/2002 | Eppink et al. |
| 6,494,272 B1 | 12/2002 | Eppink et al. |
| 6,615,933 B1 | 9/2003 | Eddison |
| 6,668,936 B2 | 12/2003 | Williamson, Jr. et al. |
| 6,668,949 B1 | 12/2003 | Rives |
| 6,708,785 B1 | 3/2004 | Russell et al. |
| 6,732,817 B2 | 5/2004 | Dewey et al. |
| 7,036,611 B2 | 5/2006 | Radford et al. |
| 7,048,078 B2 | 5/2006 | Dewey et al. |
| 7,314,099 B2 | 1/2008 | Dewey et al. |
| 7,513,318 B2 | 4/2009 | Underwood et al. |
| 7,549,485 B2 | 6/2009 | Radford et al. |
| 7,681,666 B2 | 3/2010 | Radford et al. |
| 7,900,717 B2 | 3/2011 | Radford et al. |
| 8,020,635 B2 | 9/2011 | Radford |
| 2002/0070052 A1 | 6/2002 | Armell |
| 2003/0029644 A1 | 2/2003 | Hoffmaster et al. |
| 2005/0205305 A1 | 9/2005 | Stout et al. |
| 2005/0241858 A1 | 11/2005 | Eppink et al. |
| 2008/0128169 A1 | 6/2008 | Radford et al. |
| 2008/0128175 A1 | 6/2008 | Radford et al. |
| 2009/0145666 A1 | 6/2009 | Radford et al. |
| 2010/0175927 A1 * | 7/2010 | Zulak ............... 175/413 |
| 2010/0212970 A1 | 8/2010 | Radford et al. |
| 2011/0284233 A1 | 11/2011 | Wu et al. |

FOREIGN PATENT DOCUMENTS

| | | |
|---|---|---|
| EP | 1044314 A1 | 3/2005 |
| GB | 2328964 A | 3/1999 |
| GB | 2344122 A | 5/2000 |
| GB | 2344607 A | 6/2000 |
| GB | 2344122 B | 4/2003 |
| WO | 0031371 A1 | 6/2000 |

OTHER PUBLICATIONS

International Written Opinion for International Application No. PCT/US2013/041393 dated Aug. 23, 2013, 8 pages.
International Preliminary Report on Patentability for International Application No. PCT/US2013/041393 dated Nov. 18, 2014, 9 pages.
International Search Report for International Application No. PCT/US2012/024318 dated Oct. 8, 2012, 4 pages.
International Written Opinion for International Application No. PCT/US2012/024318 dated Oct. 8, 2012, 4 pages.
International Preliminary Report on Patentability for International Application No. PCT/US2012/024318 dated Aug. 13, 2013, 5 pages.

\* cited by examiner

UTILIZATION OF EXPANDABLE REAMER BLADES IN RIGID EARTH-BORING TOOL BODIES

CROSS-REFERENCE TO RELATED APPLICATION

This application claims the benefit of U.S. Provisional Patent Application Ser. No. 61/647,640, filed May 16, 2012, the disclosure of which is hereby incorporated herein in its entirety by this reference.

TECHNICAL FIELD

The present disclosure relates generally to downhole tools for use in subterranean wellbores and, more specifically, to removable reamer blades configured for rigid attachment to earth-boring tool bodies, such as reamers and drill bits.

BACKGROUND

A variety of approaches have been employed for enlarging a diameter of a wellbore. One approach used to enlarge a subterranean wellbore includes using eccentric and bi-center bits. For example, an eccentric bit with a laterally extended or enlarged cutting portion is rotated about its axis to produce an enlarged wellbore diameter. A bi-center bit assembly employs two longitudinally superimposed bit sections with laterally offset axes, which, when rotated, produce an enlarged wellbore diameter.

Expandable reamers may also be used to enlarge subterranean wellbores and may include blades that are slidably, pivotably or hingedly coupled to a tubular body and actuated by way of hydraulic pressure. The blades of these currently available expandable reamers utilize pressure from inside a tool body of the expandable reamer to force the blades, carrying cutting elements, radially outward to engage the formation material defining a wall of the wellbore. The blades in these expandable reamers are initially retracted to permit the expandable reamer to be run through the wellbore on a drill string and, once the expandable reamer is positioned at a desirable location within a wellbore (e.g., beyond the end of a casing section), the blades are extended so the bore diameter may be increased.

BRIEF SUMMARY

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

In some embodiments, the present disclosure includes an earth-boring tool, comprising a tool body configured to be coupled with another component in a drill string, and at least one reamer blade attached to the tool body and carrying a cutting structure, the tool body having a longitudinal axis. The at least one reamer blade is configured for use in an expandable reaming apparatus and includes at least one feature configured to engage a complementary feature of the expandable reaming apparatus while allowing movement of the at least one reamer blade between a refracted position and an extended position with respect to the expandable reaming apparatus. The at least one reamer blade is substantially immovable relative to the tool body during use of the earth-boring tool in the formation of a subterranean wellbore.

In additional embodiments, the present disclosure includes a method of forming an earth-boring tool, comprising providing a tool body having a longitudinal axis and configured to be coupled within another component in a drill string; and attaching at least one reamer blade carrying a cutting structure to the tool body. The at least one reamer blade is configured for use in an expandable reaming apparatus and includes at least one feature configured to engage a complementary feature of the expandable reaming apparatus while allowing movement of the at least one reamer blade between a refracted position and an extended position with respect to the expandable reaming apparatus. The at least one reamer blade is substantially immovable relative to the tool body during use of the earth-boring tool in the formation of a subterranean wellbore. Attaching the at least one reamer blade carrying a cutting structure to the tool body further comprises positioning a mounting surface of the at least one reamer blade to be radially inward the tool body and positioning the cutting structure of the at least one reamer blade to be radially outward the tool body. The method includes affixing the at least one reamer blade to the tool body, wherein the at least one reamer blade is substantially immovable relative to the tool body during use of the earth-boring tool in the formation of a subterranean wellbore.

In yet other embodiments, the present disclosure includes a method of forming an earth-boring tool comprising removing at least one reamer blade from an expandable reaming apparatus and attaching the at least one reamer blade to a tool body, wherein the at least one reamer blade is substantially immovable in relation to the tool body during use of the earth-boring tool in the formation of a subterranean wellbore.

BRIEF DESCRIPTION OF THE DRAWINGS

While the specification concludes with claims particularly pointing out and distinctly claiming what are regarded as embodiments of the present disclosure, the advantages of embodiments of the disclosure may be more readily ascertained from the description of certain examples of embodiments of the disclosure when read in conjunction with the accompanying drawings, in which:

DETAILED DESCRIPTION

The illustrations presented herein are not meant to be actual views of any particular cutting element, structure, or device, but are merely idealized representations that are used to describe embodiments of the disclosure.

Any headings used herein should not be considered to limit the scope of embodiments of the present disclosure as defined by the appended claims and their legal equivalents. Concepts described in any specific heading are generally applicable in other sections throughout the entire specification.

A number of references are cited herein, the entire disclosure of each of which is incorporated herein in its entirety by this reference for all purposes. Further, none of the cited references, regardless of how characterized herein, is admitted as prior art relative to the present disclosure of the subject matter claimed herein.

Figure 1:
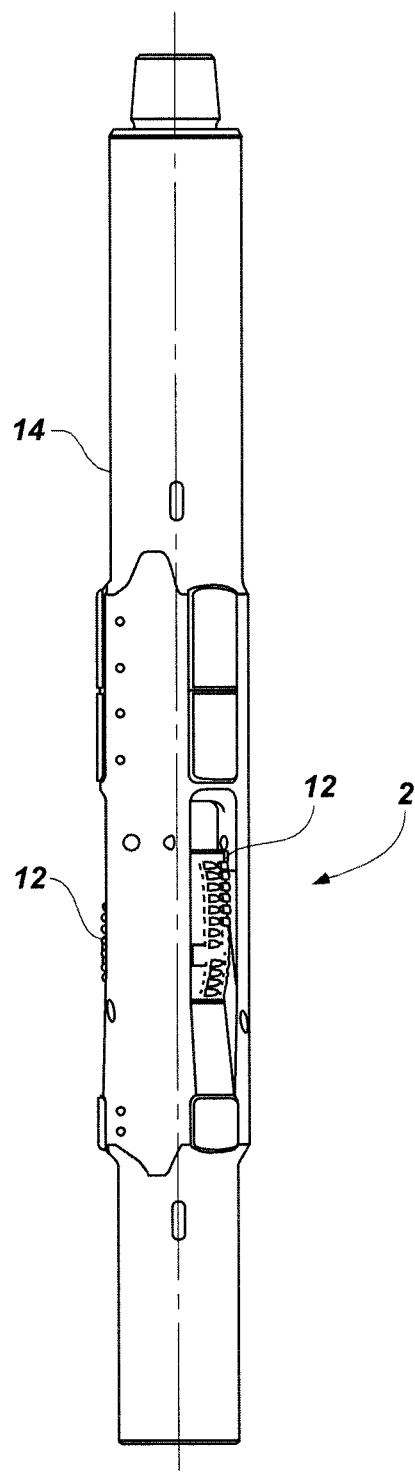
FIG. 1 is a side view of a prior art expandable reamer apparatus having a plurality of removable reamer blades.

FIG. 1 illustrates an example of a prior art expandable reamer 10 used in a bottom-hole assembly (BHA) to enlarge a portion of a wellbore. The expandable reamer 10 has three sliding blades 12 (two of which are visible in FIG. 1) positionally retained in a circumferentially spaced relationship in a generally cylindrical tubular body 14 of the expandable reamer 10. The blades 12 are movable relative to the tubular body 14 during use of the expandable reamer 10 between a retracted position and an extended position responsive to application of hydraulic pressure.

The blades 12 and adjacent regions of the tubular body 14 may have complementary mating features that retain the blades 12 within the tubular body 14, but allow the blades 12 to move relative to the tubular body 14 between the extended and refracted positions. For example, one of the blades 12 and the tubular body 14 may include elongated channel recesses, or "grooves," therein, and the other of the blades 12 and the tubular body 14 may include complementary elongated protrusions that extend into the grooves. In other words, the tubular body 14 may include blade tracks, and the blades 12 may include features that engage in a mating configuration with the blade tracks in such a manner as to retain the blades 12 within the tubular body 14 while allowing the blades 12 to slide along the blade tracks between the extended and refracted positions. In this manner, the blades 12 include at least one feature configured to engage a complementary feature of the expandable reamer 10 allowing movement of the blades 12 between a refracted position and an extended position with respect to the tubular body 14 of the expandable reamer 10.

Figure 2:
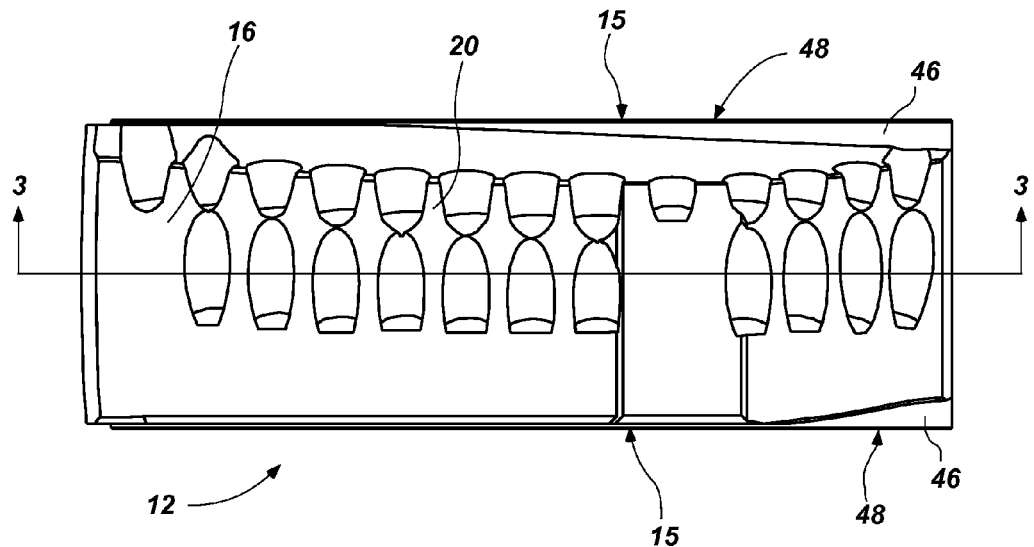
FIG. 2 shows a top view of a removable reamer blade configured for use with an expandable reamer apparatus, like that of FIG. 1.
Figure 3:
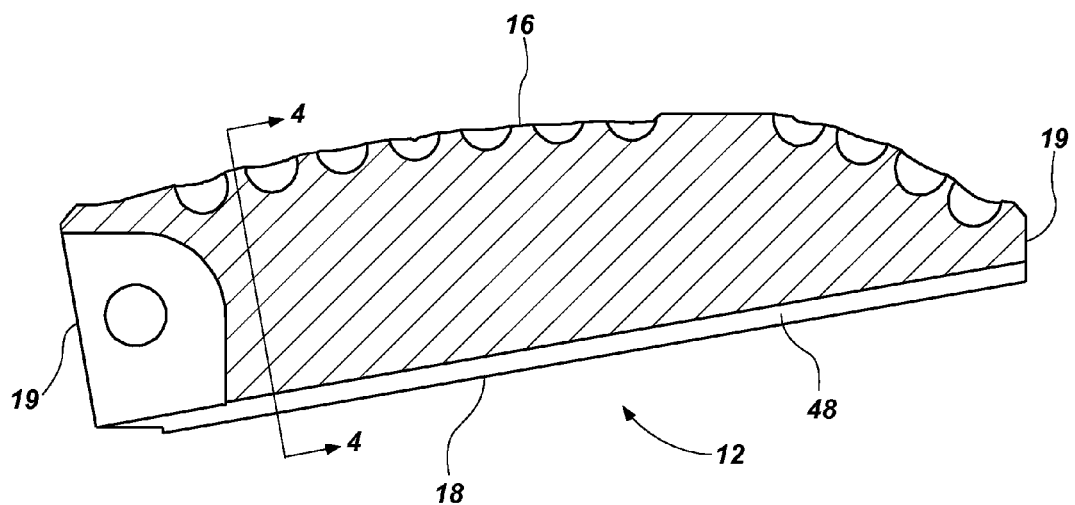
FIG. 3 shows a longitudinal cross-sectional view of the reamer blade taken along section line 3-3 in FIG. 2.
Figure 4:
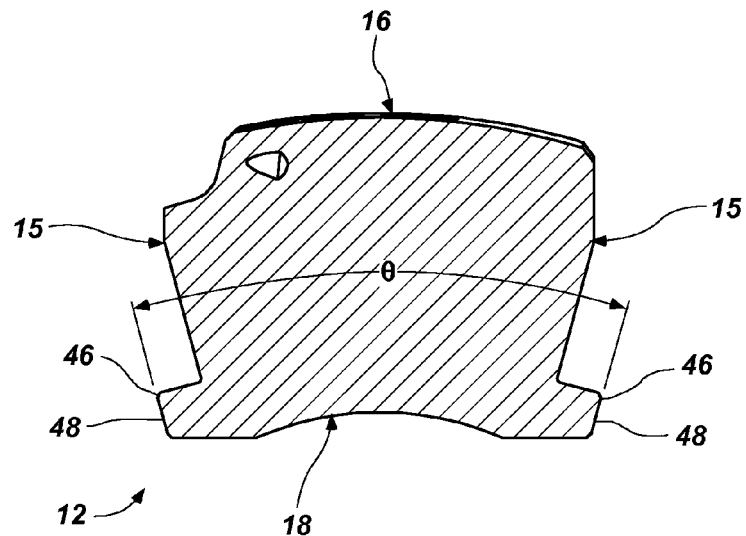
FIG. 4 shows a transverse cross-sectional view of the reamer blade taken along line 4-4 of FIG. 3.

FIGS. 2 through 4 illustrate an example embodiment of a removable reamer blade 12 of an expandable reamer apparatus, which may be attached in a fixed, non-movable configuration to a body of an earth-boring tool, in accordance with embodiments of the present disclosure. Such embodiments allow expandable reamer blades to be used in multiple applications. The blades 12 include opposing lateral sides 15 (FIGS. 2 and 4), one of which is a rotationally leading side and the other of which is a rotationally trailing side during use, and have a cutting surface 16 on a radially outward side of the blade 12 and a mounting surface 18 on a radially inward side of the blade 12. The blades 12 also have opposing longitudinal ends 19. A body of each blade 12 may comprise a metal alloy, such as steel, or it may comprise a composite material such as ceramic-metal (cermet) composite material. As an example of such a ceramic-metal composite material, the blades 12 may comprise metal carbide particles (e.g., tungsten carbide particles) dispersed throughout and cemented within a metal matrix material (e.g., cobalt or a cobalt alloy).

As non-limiting examples, the blades 12 may comprise blades as described in any of U.S. Pat. No. 8,020,635, to Radford, issued Sep. 20, 2011; U.S. Pat. No. 7,900,717, to Radford et al., issued Mar. 8, 2011; U.S. Pat. No. 7,681,666, to Radford et al., issued Mar. 23, 2010; U.S. Pat. No. 7,549,485, to Radford et al., issued Jun. 23, 2009;U.S. Pat. No. 7,036,611, to Radford et al., issued May 2, 2006, the disclosure of each of which is incorporated herein in its entirety by this reference.

The blades 12 may each comprise a cutting structure 20 on the cutting surface 16 for engaging formation material of a wall of a wellbore. The cutting structure 20 may comprise a deposit of hardfacing material (not shown) disposed over at least a portion of the blade 12. In additional embodiments, the blades 12 may each carry a plurality of cutting elements 22 (shown in FIGS. 5 through 7) for engaging the wall of the wellbore. The cutting elements 22 may be polycrystalline diamond compact (PDC) cutters or other cutting elements known to a person of ordinary skill in the art and as generally described in the references identified above.

Figure 5:
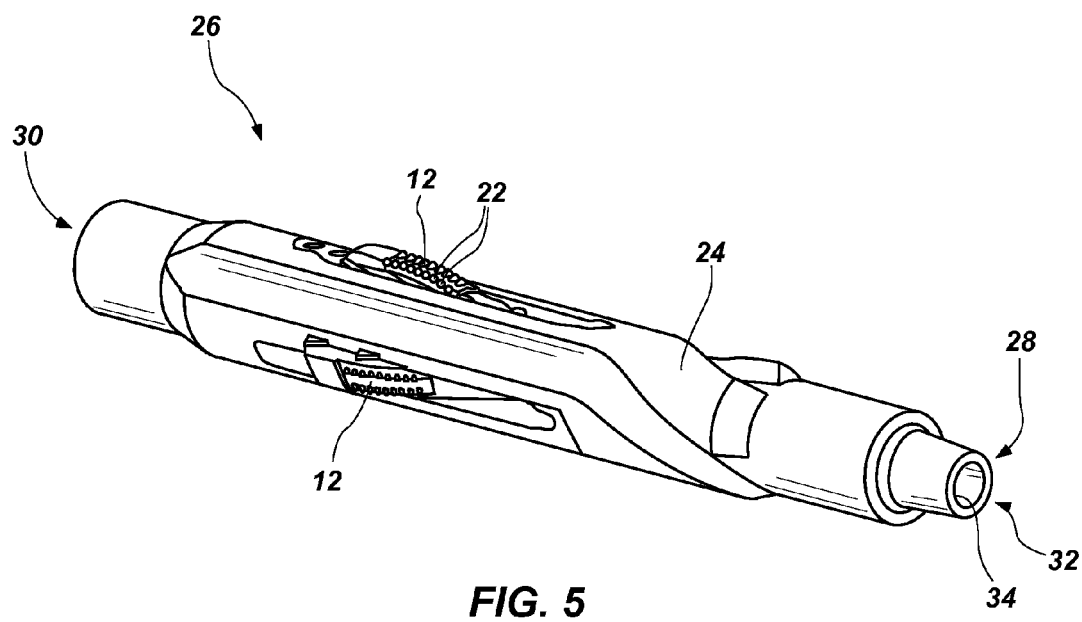
FIG. 5 illustrates a perspective view of a fixed-blade reaming apparatus having the removable reamer blade of FIGS. 2 through 4 rigidly attached thereto in a non-movable configuration.

Referring now to FIG. 5, in accordance with embodiments of the present disclosure, reamer blades, such as the reamer blades 12, which are configured to be used in an expandable reamer, such as the expandable reamer 10, are rigidly secured in a non-movable, fixed manner to a tool body 24 of a downhole tool to form a fixed-blade reaming apparatus 26 that may be used to enlarge a portion of a wellbore. It is to be recognized that the tool body 24 lacks an activation mechanism; specifically, the tool body 24 does not have a mechanism for moving the blade 12 from a refracted position to an extended position with respect to the tool body 24. Additionally, the blades 12 are unresponsive to hydraulic pressure within the tool body 24, rendering the blades 12 immovable relative to the tool body 24, even during use of the fixed-blade reaming apparatus 26 in the formation of a subterranean wellbore. The tool body 24 of the fixed-blade reaming apparatus 26 may have a lower end 28 and an upper end 30 with a centerline or longitudinal axis L extending therebetween (shown in FIG. 7). The terms "lower" and "upper," as used herein with reference to the ends 28, 30, refer to the typical positions of the ends 28, 30 relative to one another when the fixed-blade reamer 26 is positioned within a wellbore. In some embodiments, as shown in FIG. 5, the tool body 24 may be substantially tubular, with a drilling fluid flow path 32 extending longitudinally through an inner bore 34 of the tool body 24 between the lower and upper ends 28, 30. In embodiments wherein a tubular tool body 24 is utilized, the drilling fluid flow path 32 may direct fluid substantially through the inner bore 34 of the tool body 24.

The lower end 28 of the tool body 24 may include a set of threads (e.g., a threaded male pin member) (not shown) for connecting the lower end 28 to another section of drill string or a component of a bottom-hole assembly. Similarly, the upper end 30 of the tool body 24 may include a set of threads (e.g., a threaded female box member) for connecting the upper end 30 to a section of a drill string or another component of a bottom-hole assembly.

The fixed-blade reamer 26 is shown having three blades 12 (two of which are visible in FIG. 5) positionally retained in circumferentially spaced, longitudinally extending slots 36 in the tool body 24 of the fixed-blade reamer 26. The blades 12 may be configured as described previously with reference to FIGS. 2 through 4. It is to be appreciated that one, two, three, four, five, or more than five blades 12 may be affixed to the tool body 24 within corresponding slots 36. Moreover, while the blades 12 are symmetrically circumferentially positioned along the tool body 24 in the embodiment of FIG. 5, the blades 12 may also be positioned circumferentially asymmetrically around the tool body 24. Additionally, the blades 12 may be positioned at the same longitudinal position along the tool body 24, or at different longitudinal positions.

Figure 6:
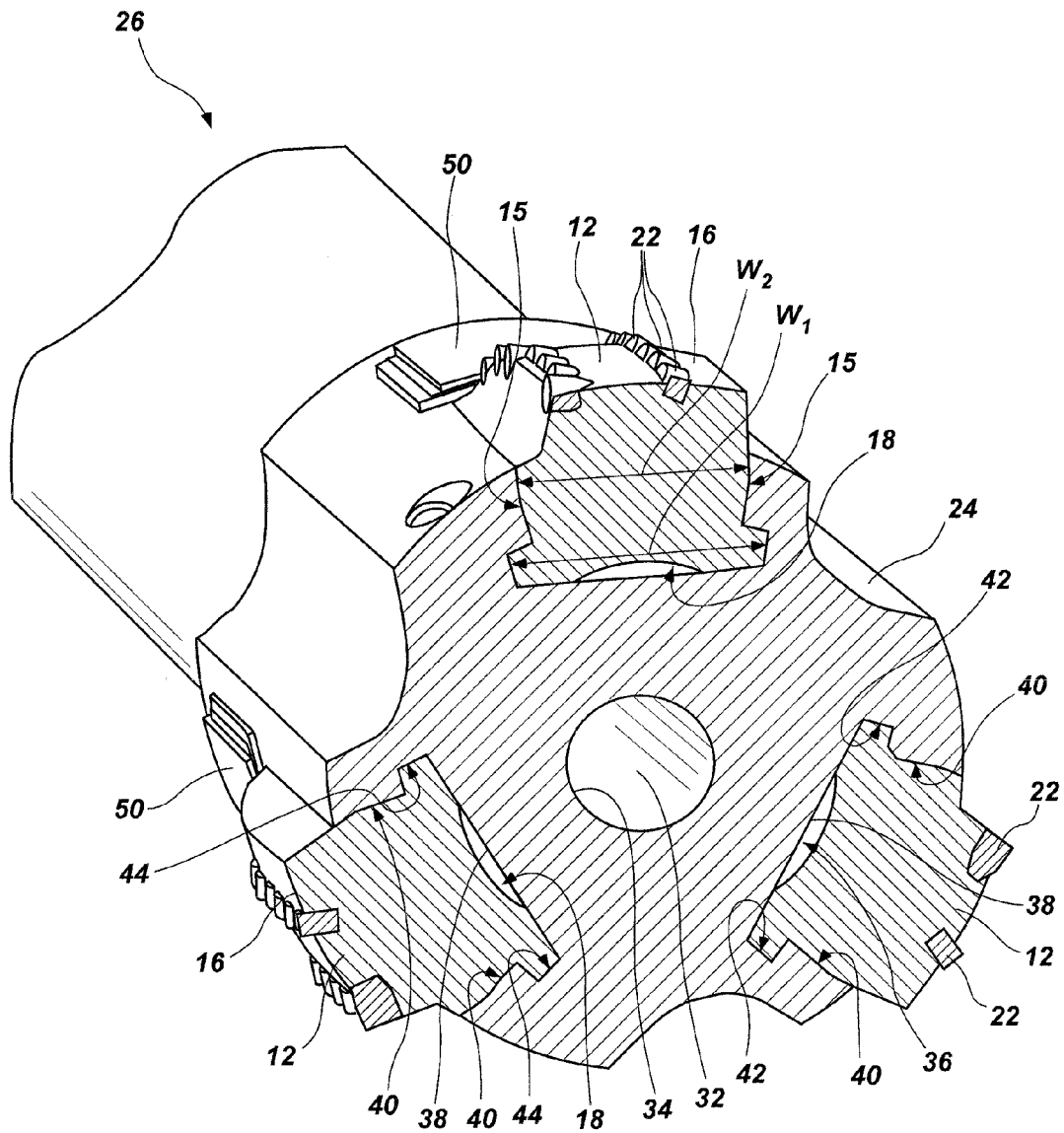
FIG. 6 illustrates a perspective, cross-sectional view of an embodiment of the fixed-blade reaming apparatus of FIG. 5.
Figure 7:
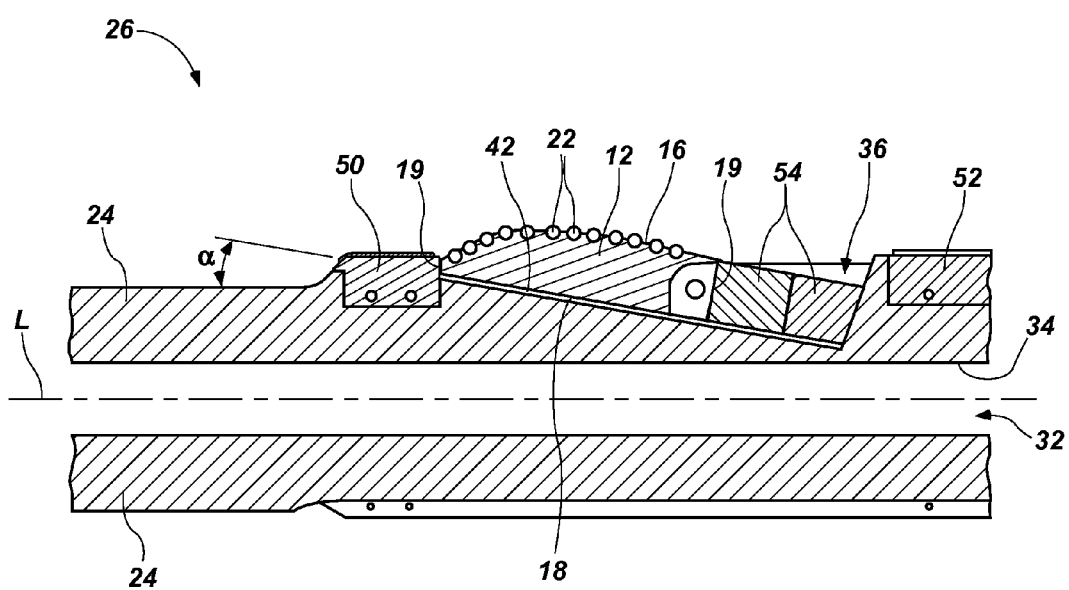
FIG. 7 illustrates a longitudinal cross-sectional view of the fixed-blade reaming apparatus of FIG. 6.

Referring now to FIG. 6, a perspective, cross-sectional view of the tool body 24 is shown. The reamer blades 12 are rigidly secured to the tool body 24 in the slots 36. The slots 36 may each include a bottom surface 38 and laterally opposing sidewalls 40 formed in the tool body 24. The slots 36 may also be configured with one or more blade tracks 42 formed therein for allowing slidable insertion of the blades 12 into the tool body 24 and also for radially retaining the blades 12 in the tool body 24 after the blades 12 are inserted into the tool body 24 and fixedly attached thereto. The blade tracks 42 may comprise recesses or channels, as shown in FIG. 6. The recesses or channels may extend along the tool body 24 in a longitudinal direction that is also oriented at an acute angle α to the longitudinal axis L of the tool body 24, as shown in FIG. 7. In other words, the blade tracks 42 may extend longitudinally along the tool body 24 on a slanted slope having the acute angle α with respect to the longitudinal axis L of the tool body 24. Referring again to FIG. 6, each blade track 42 may include a pair of grooves 44 formed in the lateral sidewalls 40 of the slot 36 and axially extending along the blade track 42 proximate the bottom surface 38 of the slot 36. The grooves 44 may have a dovetail cross-sectional shape in some embodiments. The blades 12 may be held in place along the blade tracks 42 by guides 46 formed on the blades 12 proximate the mounting surface 18 (also shown in FIGS. 3 and 4). Each guide 46 comprises a rail 48 (e.g., an elongated protrusion) oppositely located on lateral sides 15 of the blade 12. The rails 48 have a size and cross-sectional shape substantially matching the size and cross-sectional shape of the grooves 44 of the blade track 42 in order to allow slidable insertion of the blades 12 into the slots 36. Referring again to FIG. 4, each guide 46 may have an included angle θ that is selected to prevent binding with the mating grooves 44 of the blade track 42 as the blade 12 is inserted into position in the blade track 42. Referring again to FIG. 6, the pair of grooves 44 are configured such that a width $W_1$ of the slot 36 within the grooves 44 is greater than a width $W_2$ of the slot 36 radially outward from the pair of grooves 44. Thus, a blade 12 slidably inserted in the blade track 42 within a slot 36 of the tool body 24 is substantially radially retained in the blade track 42 by interference between the rails 48 and a portion of the tool body 24 radially outward of the pair of grooves 44.

As illustrated in FIG. 7, the extent to which each blade 12 extends radially outward from an outer surface of the tool body 24 may be predetermined by the longitudinal placement of the blade 12 along the track 42. With continued reference to FIG. 7, one or more of an upper and lower stabilizer block 50, 52 may be affixed to the tool body 24. The stabilizer blocks 50, 52 may be configured as described in U.S. Patent Publication No. 2010/0212970, to Radford et al., which was published Aug. 26, 2010, now U.S. Pat. No. 8,181,722, issued May 22, 2012, the entire disclosure of which is incorporated herein in its entirety by this reference. Upper stabilizer block 50 may be attached to the tool body 24 in a manner causing the stabilizer block 50 to abut a longitudinal end 19 of the reamer blade 12. As the upper stabilizer block 50 is attached to the tool body 24 in a non-movable, fixed position, the upper stabilizer block 50 may prevent the blade 12 from sliding along the track 42, thereby rigidly retaining the blade 12 in position on the tool body 24. Additionally, one or more stop blocks 54 may be secured to the tool body 24 in the slot 36 in a manner to abut a longitudinal end 19 of the blade 12 opposite the stabilizer block 50. The size and shape of the stabilizer block 50, together with the size and shape of the one or more stop blocks 54, may be selectively configured to position the blade 12 in a fixed manner at a any desirable position along the track 42, which position will at least partially determine the distance to which the blade 12 extends radially outward from the tool body 24, and, hence, the diameter to which a wellbore may be reamed using the reamer 26. Thus, the blades 12 may be rigidly affixed to the tool body 24 collectively by the upper stabilizer block 50, the engagement of the rails 48 with the grooves 44, and, optionally, the one or more stop blocks 54.

In view of the above, the distance to which the blade 12 extends radially outward from an outer surface of the tool body 24 may be controlled or predetermined by a variety of factors. For example, in some embodiments, the radial position of the blade 12 may be controlled by selectively designing and configuring one or more of the size, shape, and location of the upper stabilizer block 50. In additional embodiments, the radial position of the blade 12 may be controlled by selectively designing and configuring the length of the blade track 42 as well as the acute angle a of the slanted slope of the blade track 42 with respect to the longitudinal axis L of the tool body 24. In additional embodiments, the radial position of the blade 12 may be controlled by selectively designing and configuring a number and size of stop blocks 54 employed to abut the longitudinal end of the blade 12 opposite the upper stabilizer block 50. In yet additional embodiments, any combination of the foregoing factors may be used to selectively control the distance to which the blades 12 extend from an outer surface of the tool body 24.

In additional embodiments, the reamer blades 12 may have other types and configurations of mating features for mechanical retention of the blades 12 within the tubular body 24. Moreover, the bottom surface 38 of the blade slots 36 may alternatively extend substantially parallel with the longitudinal axis L of the tool body 24. It is to be appreciated that any type of reamer blade configured for use in an expandable reaming apparatus may be rigidly affixed to a fixed-blade reaming tool in accordance with additional embodiments of the present disclosure.

Figure 8:
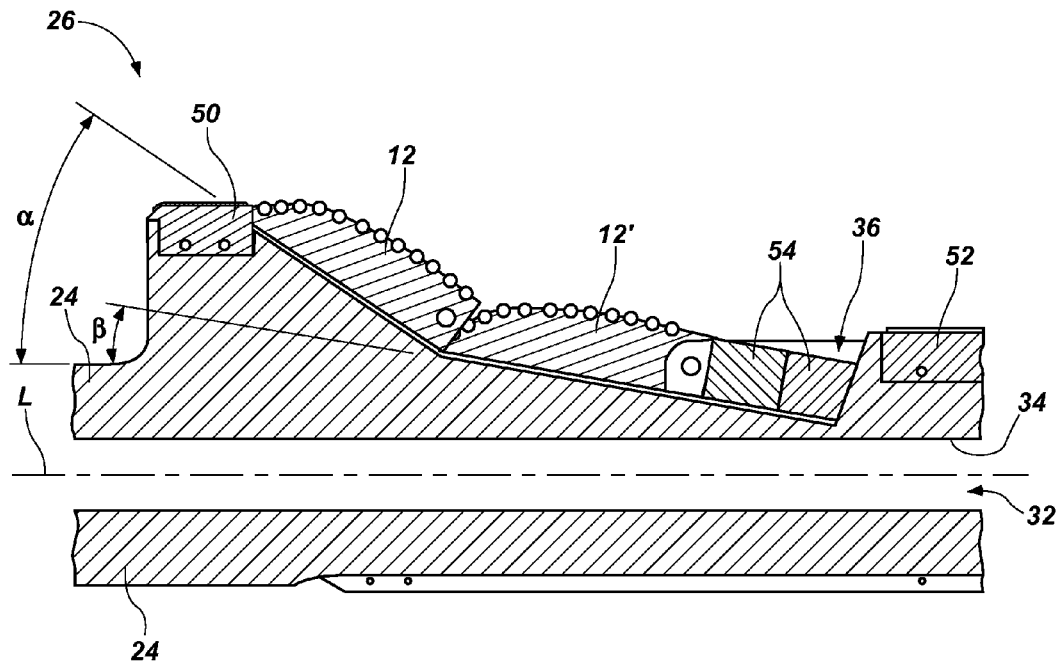
FIG. 8 illustrates a longitudinal cross-sectional view of a fixed-blade reaming apparatus with a "stacked" blade configuration.
Figure 9:
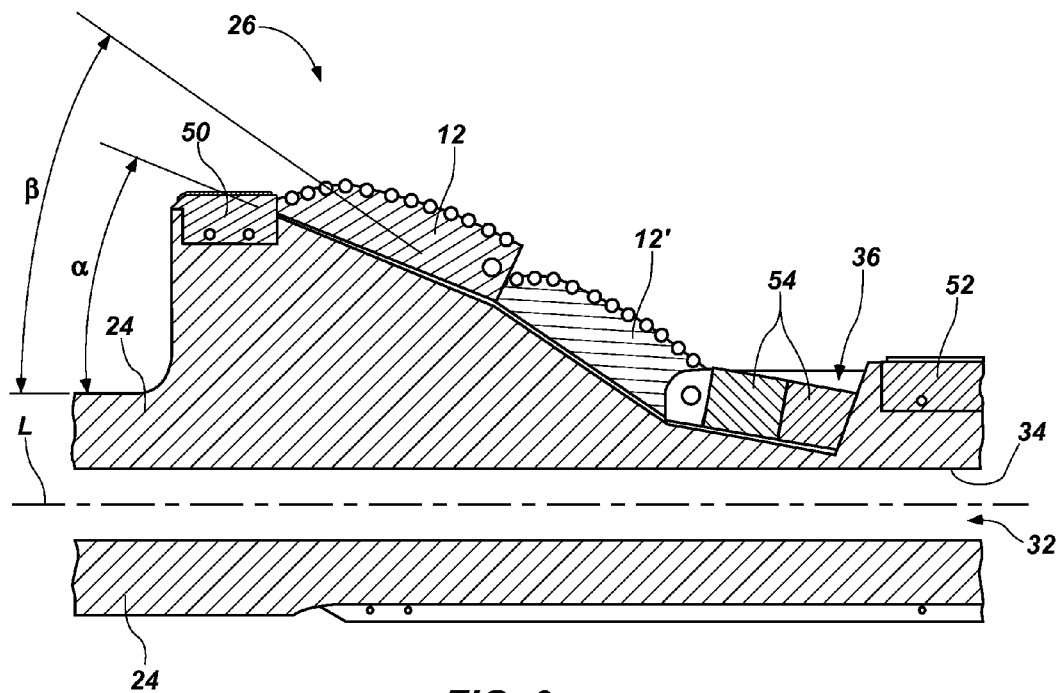
FIG. 9 illustrates a longitudinal cross-sectional view of a fixed-blade reaming apparatus with a "stacked" blade configuration.

In yet additional embodiments, as shown in FIGS. 8 and 9, two consecutive blades 12 may be longitudinally affixed to the tool body 24 in a "stacked" configuration. A first stacked blade 12 may be oriented at a first angle a with respect to the longitudinal axis L of the tool body, and a second stacked blade 12' may be oriented at a second angle β with respect to the longitudinal axis L of the tool body 24. The first and second angles α, β may be equivalent (not shown). In alternative embodiments, as shown in FIG. 8, the first angle α may be greater than the second angle β with respect to the longitudinal axis L; or, as shown in FIG. 9, the first angle a may be less than the second angle β with respect to the longitudinal axis.

Figure 10:
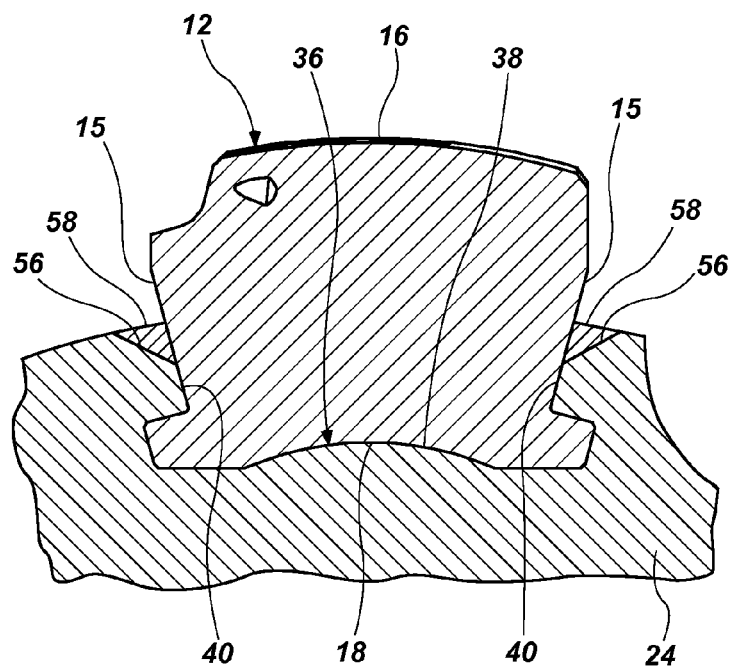
FIG. 10 is a transverse cross-sectional view through a portion of a reamer blade, which is configured for use with an expandable reamer apparatus like that of FIG. 1, but which is welded to a portion of a tool body of a fixed-blade reaming apparatus in a non-movable configuration.

In the embodiment of FIGS. 5 through 9, the blades 12 are locked in position within the tubular body 24 in a manner that prevents the blades 12 from sliding along the tracks 42 using the upper stabilizer block 50. Other means for locking the blades 12 in position on the tracks 42 also may be employed. For example, in alternative embodiments, the blades 12 may be rigidly affixed to the tool body 24 by welding the blades 12 to the tubular body 24. FIG. 10 illustrates a simple lateral cross-sectional view of a reamer blade 12 having a cutting surface 16, a mounting surface 18, and opposing lateral sides 15. The blade 12 is configured for use with an expandable reamer, such as the expandable reamer 10 of FIG. 1. Thus, the blade 12 may include rails and the tool body 24 may include mating tracks, as discussed above with reference to FIGS. 2 through 4. The blade 12 is disposed in a longitudinally extending slot 36 in the tool body 24. The slot 36 has a bottom surface 38 and laterally opposing sidewalls 40. As shown in FIG. 10, a weld groove 56 is formed in the tool body 24 adjacent the lateral sidewalls 40 of the slots 36. After the blade 12 is disposed in the slot 36 and located at a desirable position relative to the tool body 24 along the track, a weld 58 is formed in the weld groove 56 in a manner that immovably affixes the blade 12 to the tool body 24.

Figure 11:
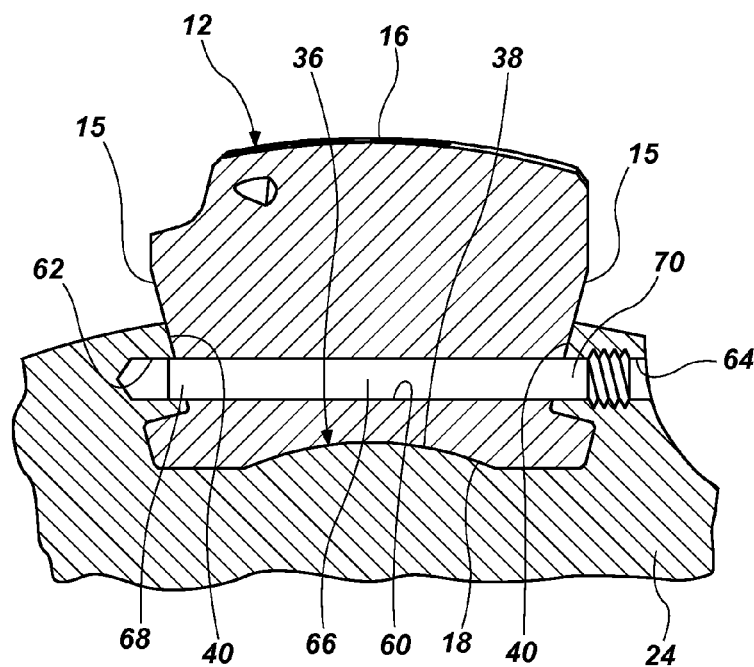
FIG. 11 is a transverse cross-sectional view through a portion of a reamer blade, which is configured for use with an expandable reamer apparatus like that of FIG. 1, but which is mechanically fastened to a portion of a tool body of a fixed-blade reaming apparatus in a non-movable configuration.

Referring now to FIG. 11, a simple lateral cross-sectional view of the reamer blade 12 is shown mechanically fastened to the tool body 24 according to another embodiment of the present disclosure. The blade 12 may be configured, as described above, having a cutting surface 16, a mounting surface 18, and opposing lateral sides 15. The blade 12 is configured for use with an expandable reamer, such as the expandable reamer 10 of FIG. 1. Thus, the blade 12 may include rails and the tool body 24 may include mating tracks, as discussed above with reference to FIGS. 2 through 4. The blade slot 36 may comprise a bottom surface 38 and laterally opposing sidewalls 40. As depicted, the blade 12 may have one or more transverse bores 60 extending therethrough between the opposing lateral sides 15 of the blade 12. When the blade 12 is received in the slot 36 in its desired position, the transverse bore 60 is aligned with a blind bore 62 extending into a lateral sidewall 40 of the slot 36 on one side 15 of blade 12 and with an open bore 64 extending into a lateral sidewall 40 on an opposing side of blade 12. A lock rod 66 is inserted through each of the open bore 64 and the aligned transverse bore 60 and into the aligned blind bore 62 so that a distal end 68 of lock rod 66 is received and locked within the aligned blind bore 62. A proximal end 70 of each lock rod 66 resides completely within the open bore 64 when the lock rod 66 is fully inserted into the blind bore 62. Thus, the lock rod 66 prevents the blade 12 from moving relative to the tool body 24 along the blade track. Instead of a lock rod 66, a bolt, screw, or any other type of mechanical retaining feature may be used to provide mechanical interference securing the blade 12 in a fixed position along the blade track.

Other configurations for mechanically attaching the blades 12 to the tool body 24 are within the scope of the embodiments disclosed herein. For example, instead of blind bore 62, the distal end 68 of the lock rod 66 may be received in a second open bore aligned with the transverse bore 60. In other embodiments, the transverse bore 60 may extend longitudinally through the blade 12 and may be aligned with one or more bores, including open bores and/or blind bores, in longitudinally opposing sides 40 of the slot 36. Any mechanical means of fastening the blade 12 to the tool body 24 is within the scope of the embodiments disclosed herein, including, by way of non-limiting examples, bolts, screws, retention pads, shrink fitting, press fitting, male and female elements formed on mating portions of the blade 12 and tool body 24, and other fasteners.

Figure 12:
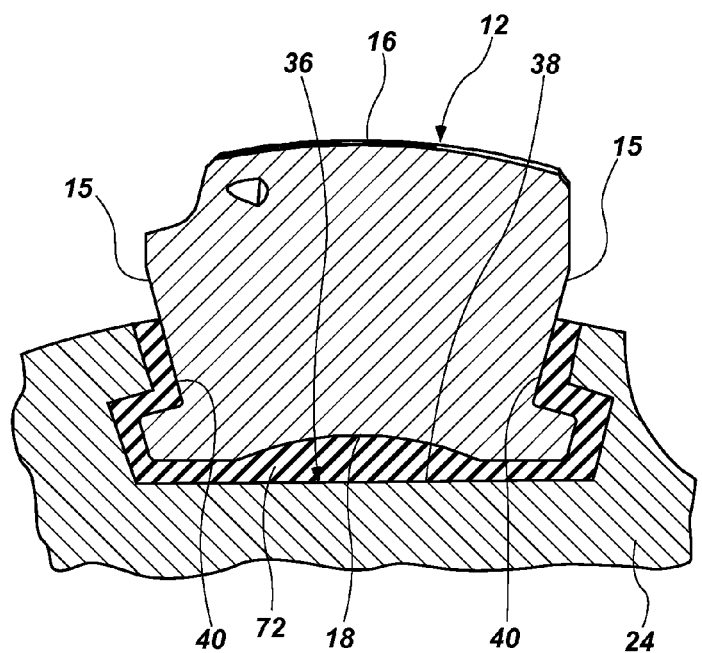
FIG. 12 is a transverse cross-sectional view through a portion of a reamer blade, which is configured for use with an expandable reamer apparatus like that of FIG. 1, but which is brazed in a fixed position to a corresponding portion of a tool body of a fixed-blade reaming apparatus.

In other embodiments, as illustrated in FIG. 12, the blade 12 may be rigidly affixed to the tool body 24 by brazing the blade 12 to the tool body 24 within the slot 36. The blade 12 may be configured, as described above, having a cutting surface 16, a mounting surface 18, and opposing lateral sides 15. The blade 12 is configured for use with an expandable reamer, such as the expandable reamer 10 of FIG. 1. Thus, the blade 12 may include rails and the tool body 24 may include mating tracks, as discussed above with reference to FIGS. 2 through 4. The slot 36 may comprise a bottom surface 38 and laterally opposing sidewalls 40. A brazing alloy 72 may be disposed between the opposing lateral sidewalls 40 of the blade slot 36 and mating opposing lateral sides 15 of the blade 12, as shown in FIG. 12. For example, the brazing alloy 72 may be heated to a temperature sufficient to melt the brazing alloy 72, which then may be allowed to infiltrate into a gap at the interface between the blade 12 and the tool body 24, after which the brazing alloy 72 may be allowed to cool and solidify. The brazing alloy 72 thus bonds and locks the blade 12 to the tool body 24 in an immovable manner. As known in the art, a flux may be used to protect the brazing alloy 72 from oxidation during the brazing process. It is to be appreciated that, in additional embodiments, the blades 12 may be rigidly affixed to the tool body 24 using any combination of the methods and configurations described above.

In additional embodiments, blades 12 configured for use with an expandable reamer apparatus may be rigidly coupled to earth-boring tools other than reamers.

Figure 13:
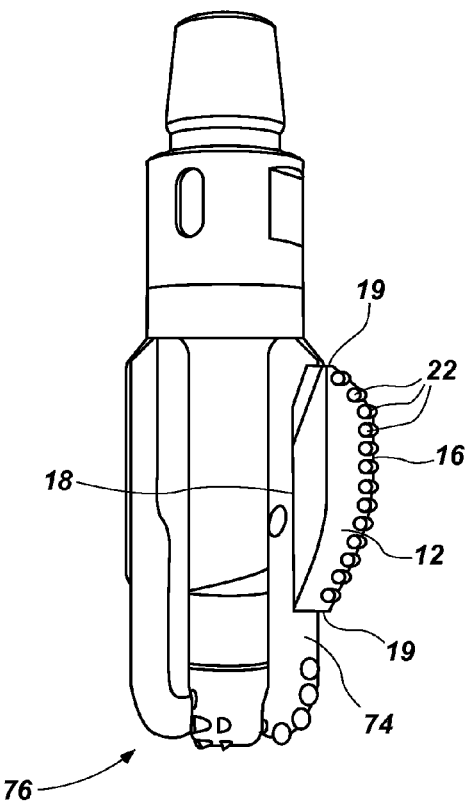
FIG. 13 shows a perspective view of an earth-boring rotary drill bit having a reamer blade, which is configured for use with an expandable reamer apparatus like that of FIG. 1, but which is rigidly attached to the body of the earth-boring rotary drill bit in a non-movable configuration.

For example, FIG. 13 illustrates an earth-boring rotary drill bit 76 to which a reamer blade 12, configured as previously described herein, is rigidly affixed. The reamer blade 12 is attached to a lateral side 74 or "gage portion" of the earth-boring rotary drill bit 76 in a manner to allow simultaneously drilling and reaming of a wellbore. For example, longitudinally extending blade slots (not shown) having tracks therein for engaging rails or other features on the blade 12, configured similarly to blade slots 36 as previously described herein, may be formed in the lateral side 74 of the drill bit 76, and may include a bottom surface and laterally opposing sidewalls with one or more blade tracks formed therein for allowing slidable insertion of the blades 12 into the lateral side 74 of the drill bit 76 and for radially retaining the blades 12 in the gage portion 74 of the bit 76. The blade tracks may extend longitudinally along the gage portion 74 on a slanted slope having an acute angle with respect to a longitudinal axis of the drill bit 76, in a manner similar to that described previously with reference to FIG. 7. Each track may include a pair of grooves formed in the lateral sidewalls of the slot and axially extending along the blade tracks proximate the bottom surface of the slot. The blades 12 may be held in place along the blade tracks by guides, each guide comprising a single rail oppositely located on lateral sides 15 of the blade 12 and matching the grooves in order to allow slidable placement of the blade 12 within the slot of the drill bit 76.

Additionally, a stabilizer block may be affixed to the drill bit 76 in a manner to abut a longitudinal end 19 of the reamer blade 12, preventing the blade 12 from sliding along the track once the stabilizer block has been affixed. The relative placement of the stabilizer block and blade 12 may determine the lateral extent to which the blade 12 extends from the gage portion 74 of the drill bit 76. Additionally, one or more stop blocks, similar to stop blocks 54, illustrated in FIG. 7, may be secured to the drill bit 76 in the slot in a manner to abut a longitudinal end 19 of the blade 12 opposite the stabilizer block, rigidly affixing the blade 12 in place on the track. Thus, similar to the manner described above in reference to FIG. 7, the lateral extent to which the blades 12 extend from the lateral side 74 of the drill bit 76 may be controlled or predetermined by a variety of factors, including the size and position of the stabilizer block, the length of the blade tracks as well as the acute angle of the slanted slope, the number and size of any stop blocks employed, or any combination of the foregoing factors.

In other embodiments, the blades 12 may alternatively be rigidly affixed to the drill bit 76 by using any of the methods previously described with reference to FIG. 7 for securing the blades 12 to the tool body 24 of the reamer 26.

It is to be appreciated that an earth-boring tool may be formed according to the embodiments disclosed herein. Reamer blades configured for use with expandable reaming apparatuses are specially designed and configured to be outwardly expandable responsive to hydraulic pressure. Reamer blades designed for such purposes are expensive, and the applicants have devised a method of maximizing the value of such reamer blades by utilizing the blades in an earth-boring tool that does not have a mechanism for moving the blade 12 from a retracted position to an extended position with respect to the tool body. For example, reamer blades configured for use in an expandable reamer, such as blades 12 described previously herein, may be removed from the expandable reamer and rigidly attached to a tool body in a manner wherein the blades 12 are immovably affixed to the tool body. The tool body formed by this method may be substantially identical to tool body 24, described previously in relation to FIGS. 5 through 7, or, in other embodiments, the fixed-blade tool body may be substantially identical to drill bit 76, as shown in FIG. 13, wherein the blade 12 is attached to a gage portion 74 of the drill bit 76.

Moreover, an earth-boring tool may be formed from worn or damaged blades 12 from an expandable reaming apparatus. The worn or damaged reamer blades 12 may be removed from the expandable reamer and subsequently repaired. After the blade 12 is repaired, the blade 12 may be rigidly affixed to the earth-boring tool body in a manner wherein the blade 12 is immovably affixed to the tool body, as previously described herein, wherein the tool does not have a mechanism for moving the blade 12 from a refracted potion to an extended position with respect to the tool body. The blade 12 may be immovably affixed to the tool body using any of the attachment methods and/or configurations described above, including welding, brazing, and bolting. Additionally, as described above, the blade 12 may be immovably affixed to the tool body by rigidly affixing a retention block to the tool body in a manner to abut a longitudinal end of the blade 12.

The embodiments disclosed herein enable a reamer blade configured for use in an expandable reamer to be rigidly affixed to a reamer or other type of earth-boring tool in a manner wherein the blade is immovably attached thereto.

Additional non-limiting example embodiments of the present disclosure are set forth below.

Embodiment 1: An earth-boring tool, comprising: a tool body configured to be coupled with another component in a drill string, the tool body having a longitudinal axis; and at least one reamer blade attached to the tool body and carrying a cutting structure, the at least one reamer blade configured for use in an expandable reaming apparatus and having at least one feature configured to engage a complementary feature of the expandable reaming apparatus while allowing movement of the at least one reamer blade between a retracted position and an extended position with respect to the expandable reaming apparatus, the at least one reamer blade being substantially immovable relative to the tool body during use of the earth-boring tool in the formation of a subterranean wellbore.

Embodiment 2: The earth-boring tool of Embodiment 1, wherein the tool body comprises at least one substantially longitudinally extending slot for receiving the at least one reamer blade therein, the at least one slot including: a bottom surface configured to abut a mounting surface of the at least one reamer blade; and opposing lateral sidewalls substantially extending from the bottom surface to an outer surface of the tool body.

Embodiment 3: The earth-boring tool of Embodiment 1 or Embodiment 2, wherein the at least one slot further comprising a pair of grooves formed in the opposing lateral sidewalls of the at least one slot proximate the bottom surface and extending longitudinally along at least a portion of a length of the at least one slot, wherein a width of the at least one slot within the pair of grooves is greater than a width of the at least one slot radially outward the pair of grooves, the pair of grooves being configured to receive therein a corresponding pair of rails formed on opposite lateral sides of the at least one reamer blade proximate the mounting surface, wherein interference between the pair of rails and the tool body radially outward the pair of grooves substantially prevents radial movement of the at least one reamer blade in relation to the tool body.

Embodiment 4: The earth-boring tool of any one of Embodiments 1 through 3, further comprising a retention block rigidly abutting a longitudinal end of the at least one reamer blade, wherein the retention block substantially preventing one or more of radial and longitudinal movement of the at least one reamer blade in relation to the tool body.

Embodiment 5: The earth-boring tool of any one of Embodiments 1 through 4, wherein the cutting structure comprises one or more cutting elements.

Embodiment 6: The earth-boring tool of any one of Embodiments 1 through 5, wherein the cutting structure comprises a deposit of hardfacing alloy.

Embodiment 7: The earth-boring tool of any one of Embodiments 1 through 6, wherein the tool body comprises a drill bit, the at least one reamer blade being attached to a gage portion of the drill bit in a manner to prevent movement of the at least one reamer blade in relation to the drill bit.

Embodiment 8: A method of forming an earth-boring tool, comprising: providing a tool body configured to be coupled within another component in a drill string, the tool body having a longitudinal axis; and attaching at least one reamer blade carrying a cutting structure to the tool body, the at least one reamer blade configured for use in an expandable reaming apparatus and having at least one feature configured to engage a complementary feature of the expandable reaming apparatus while allowing movement of the at least one reamer blade between a refracted position and an extended position with respect to the expandable reaming apparatus, the at least one reamer blade being substantially immovable relative to the tool body during use of the earth-boring tool in the formation of a subterranean wellbore, wherein attaching the at least one reamer blade carrying a cutting structure to the tool body further comprises: positioning a mounting surface of the at least one reamer blade to be radially inward the tool body and positioning the cutting structure of the at least one reamer blade to be radially outward the tool body; and affixing the at least one reamer blade to the tool body, wherein the at least one reamer blade is substantially immovable relative to the tool body during use of the earth-boring tool in the formation of a subterranean wellbore.

Embodiment 9: The method of Embodiment 8, further comprising forming at least one longitudinally extending slot in the tool body and configuring the at least one slot to receive the at least one reamer blade therein.

Embodiment 10: The method of Embodiment 9, further comprising: forming a pair of longitudinally extending grooves in the tool body on opposing lateral sides of the at least one slot proximate a bottom surface of the at least one slot, wherein a width of the at least one slot within the pair of grooves is greater than a width of the at least one slot radially outward of the pair of grooves; configuring the bottom surface to abut the mounting surface of the at least one reamer blade; placing the at least one reamer blade in the at least one slot, the at least one reamer blade having a pair of rails formed on opposite lateral sides of the at least one reamer blade proximate the mounting surface, the pair of rails corresponding to the pair of grooves, further comprising locating the pair of rails within the corresponding pair of grooves, wherein interference between the pair of rails and a portion of the tool body radially outward of the pair of grooves substantially prevents radial movement of the at least one reamer blade in relation to the tool body.

Embodiment 11: The method of any one of Embodiments 8 through 10, further comprising rigidly affixing a retention block to the tool body, wherein the retention block abuts a longitudinal end of the at least one reamer blade such that the retention block substantially prevents one or more of radial and longitudinal movement of the at least one reamer blade in relation to the tool body.

Embodiment 12: The method of any one of Embodiments 8 through 11, wherein rigidly affixing the retention block to the tool body comprises one of welding, brazing and bolting the retention block to the tool body.

Embodiment 13: The method of Embodiment 11 or Embodiment 12, further comprising abutting one or more stop blocks against a longitudinal end of the at least one reamer blade opposite the longitudinal end of the at least one reamer blade abutting the retention block.

Embodiment 14: The method of any one of Embodiments 9 through 13, further comprising one of welding, brazing and bolting the at least one reamer blade to the tool body within the at least one slot.

Embodiment 15: The method of any one of Embodiments 8 through 14, wherein the tool body comprises a drill bit, and attaching the at least one reamer blade carrying a cutting structure to the tool body further comprises attaching the at least one reamer blade to a gage portion of the drill bit.

Embodiment 16: A method of forming an earth-boring tool, comprising: removing at least one reamer blade from an expandable reaming apparatus; and attaching the at least one reamer blade to a tool body, wherein the at least one reamer blade is substantially immovable in relation to the tool body during use of the earth-boring tool in the formation of a subterranean wellbore.

Embodiment 17: The method of Embodiment 16, wherein the tool body comprises a drill bit, and attaching the at least one reamer blade to the tool body further comprises attaching the at least one reamer blade to a gage portion of the drill bit.

Embodiment 18: The method of Embodiment 16 or Embodiment 17, further comprising repairing the at least one reamer blade prior to attaching the at least one reamer blade to the tool body.

Embodiment 19: The method of any one of Embodiments 16 through 18, wherein attaching the at least one reamer blade to the tool body comprises one of welding, brazing, and bolting.

Embodiment 20: The method of any one of Embodiments 16 through 19, further comprising affixing a retention block to the tool body abutting at least a portion of the at least one reamer blade, the retention block substantially preventing at least one of radial and longitudinal movement of the at least one reamer blade in relation to the tool body.

While certain illustrative embodiments have been described in connection with the figures, those of ordinary skill in the art will recognize and appreciate that embodiments of the present disclosure are not limited to those embodiments explicitly shown and described herein. Rather, many additions, deletions, and modifications to the embodiments described herein may be made without departing from the scope of embodiments of the present disclosure as hereinafter claimed, including legal equivalents. In addition, features from one disclosed embodiment may be combined with features of another disclosed embodiment while still being encompassed within the scope of embodiments of the present disclosure as contemplated by the applicants.

What is claimed is:

1. An earth-boring tool, comprising:
a tool body configured to be coupled with another component in a drill string, the tool body having a longitudinal axis;
at least one reamer blade attached to the tool body and carrying a cutting structure, the at least one reamer blade configured for use in an expandable reaming apparatus and having at least one feature configured to engage a complementary feature of the expandable reaming apparatus while allowing movement of the at least one reamer blade between a retracted position and an extended position with respect to the expandable reaming apparatus; and
wherein the tool body comprises at least one substantially longitudinally extending slot for receiving the at least one reamer blade therein, the at least one slot including a bottom surface abutting a mounting surface of the at least one reamer blade, and the bottom surface and the mounting surface each radially inclined at an acute angle relative to the longitudinal axis of the tool body.

2. The earth-boring tool of claim 1, wherein the at least one slot further comprises
opposing lateral sidewalls substantially extending from the bottom surface to an outer surface of the tool body.

3. The earth-boring tool of claim 2, wherein the at least one slot further comprising a pair of grooves formed in the opposing lateral sidewalls of the at least one slot proximate the bottom surface and extending longitudinally along at least a portion of a length of the at least one slot, wherein a width of the at least one slot within the pair of grooves is greater than a width of the at least one slot radially outward the pair of grooves, the pair of grooves being configured to receive therein a corresponding pair of rails formed on opposite lateral sides of the at least one reamer blade proximate the mounting surface, wherein interference between the pair of rails and the tool body radially outward the pair of grooves substantially prevents radial movement of the at least one reamer blade in relation to the tool body.

4. The earth-boring tool of claim 3, further comprising a retention block rigidly abutting a longitudinal end of the at least one reamer blade, wherein the retention block substantially preventing one or more of radial and longitudinal movement of the at least one reamer blade in relation to the tool body.

5. The earth-boring tool of claim 1, wherein the cutting structure comprises one or more cutting elements.

6. The earth-boring tool of claim 1, wherein the cutting structure comprises a deposit of hardfacing alloy.

7. The earth-boring tool of claim 1, wherein the tool body comprises a drill bit, the at least one reamer blade being attached to a gage portion of the drill bit in a manner to prevent movement of the at least one reamer blade in relation to the drill bit.

8. A method of forming an earth-boring tool, comprising:
providing a tool body configured to be coupled within another component in a drill string, the tool body having a longitudinal axis; and
attaching at least one reamer blade carrying a cutting structure to the tool body, the at least one reamer blade configured for use in an expandable reaming apparatus and having at least one feature configured to engage a complementary feature of the expandable reaming apparatus while allowing movement of the at least one reamer blade between a retracted position and an extended position with respect to the expandable reaming apparatus, the at least one reamer blade being substantially immovable relative to the tool body during use of the earth-boring tool in the formation of a subterranean wellbore, wherein attaching the at least one reamer blade carrying a cutting structure to the tool body further comprises:
positioning a mounting surface of the at least one reamer blade to be radially inward the tool body and positioning the cutting structure of the at least one reamer blade to be radially outward the tool body, wherein the mounting surface is radially inclined at an acute angle relative to the longitudinal axis of the tool body; and
affixing the at least one reamer blade to the tool body, wherein the at least one reamer blade is substantially immovable relative to the tool body.

9. The method of claim 8, further comprising forming at least one longitudinally extending slot in the tool body and configuring the at least one slot to receive the at least one reamer blade therein.

10. The method of claim 9, further comprising:
forming a pair of longitudinally extending grooves in the tool body on opposing lateral sides of the at least one slot proximate a bottom surface of the at least one slot, wherein a width of the at least one slot within the pair of grooves is greater than a width of the at least one slot radially outward of the pair of grooves;
configuring the bottom surface to abut the mounting surface of the at least one reamer blade;
placing the at least one reamer blade in the at least one slot, the at least one reamer blade having a pair of rails formed on opposite lateral sides of the at least one reamer blade proximate the mounting surface, the pair of rails corresponding to the pair of grooves, further comprising locating the pair of rails within the corresponding pair of grooves, wherein interference between the pair of rails and a portion of the tool body radially outward of the pair of grooves substantially prevents radial movement of the at least one reamer blade in relation to the tool body.

11. The method of claim 10, further comprising rigidly affixing a retention block to the tool body, wherein the retention block abuts a longitudinal end of the at least one reamer blade such that the retention block substantially prevents one or more of radial and longitudinal movement of the at least one reamer blade in relation to the tool body.

12. The method of claim 11, wherein rigidly affixing the retention block to the tool body comprises one of welding, brazing and bolting the retention block to the tool body.

13. The method of claim 12, further comprising abutting one or more stop blocks against a longitudinal end of the at least one reamer blade opposite the longitudinal end of the at least one reamer blade abutting the retention block.

14. The method of claim 10, further comprising one of welding, brazing and bolting the at least one reamer blade to the tool body within the at least one slot.

15. The method of claim 8, wherein the tool body comprises a drill bit, and attaching the at least one reamer blade carrying a cutting structure to the tool body further comprises attaching the at least one reamer blade to a gage portion of the drill bit.

16. A method of forming an earth-boring tool, comprising:
removing at least one reamer blade from an expandable reaming apparatus; and
attaching the at least one reamer blade to a tool body, wherein a bottom, mounting surface of the at least one reamer blade is radially inclined at an acute angle relative to a longitudinal axis of the tool body, and the at least one reamer blade is substantially immovable in relation to the tool body during use of the earth-boring tool in the formation of a subterranean wellbore.

17. The method of claim 16, wherein the tool body comprises a drill bit, and attaching the at least one reamer blade to the tool body further comprises attaching the at least one reamer blade to a gage portion of the drill bit.

18. The method of claim 16, further comprising repairing the at least one reamer blade prior to attaching the at least one reamer blade to the tool body.

19. The method of claim 16, wherein attaching the at least one reamer blade to the tool body comprises one of welding, brazing, and bolting.

20. The method of claim 16, further comprising affixing a retention block to the tool body abutting at least a portion of the at least one reamer blade, the retention block substantially preventing at least one of radial and longitudinal movement of the at least one reamer blade in relation to the tool body.

* * * * *